(12) United States Patent
Nishioka et al.

(10) Patent No.: US 8,483,020 B2
(45) Date of Patent: Jul. 9, 2013

(54) PATH MECHANISM AND AN INFORMATION PROCESSING DEVICE HAVING THE PATH MECHANISM

(75) Inventors: Atsushi Nishioka, Shiojiri (JP); Koji Kawasaki, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 681 days.

(21) Appl. No.: 12/547,905

(22) Filed: Aug. 26, 2009

(65) Prior Publication Data

US 2010/0058371 A1    Mar. 4, 2010

(30) Foreign Application Priority Data

Aug. 26, 2008  (JP) ................................ 2008-216584

(51) Int. Cl.
*G11B 21/08*  (2006.01)
*G11B 17/028*  (2006.01)

(52) U.S. Cl.
USPC ............... 369/30.34; 369/30.03; 720/620; 720/601

(58) Field of Classification Search
USPC .......... 369/30.34, 30.03, 30.06, 30.57, 30.85, 369/30.55, 75.2, 77.1; 400/668; 347/171, 347/2, 104; 399/130; 720/601, 703, 614, 720/619, 620; 101/35, 44
See application file for complete search history.

(56) References Cited

U.S. PATENT DOCUMENTS

| | | | |
|---|---|---|---|
| 6,141,310 A | 10/2000 | Tanaka et al. | |
| 6,751,179 B2 | 6/2004 | Fujiwara et al. | |
| 6,782,544 B2 * | 8/2004 | Russ | 720/619 |
| 7,127,725 B2 * | 10/2006 | Lee | 720/600 |
| 7,209,156 B2 * | 4/2007 | Cummins et al. | 347/171 |
| 7,641,407 B2 * | 1/2010 | Mochizuki | 400/668 |
| 7,857,574 B2 * | 12/2010 | Kawasaki et al. | 414/792.7 |
| 8,000,180 B2 * | 8/2011 | Kawakami | 369/30.34 |
| 2007/0280057 A1 | 12/2007 | Ikeda | |

FOREIGN PATENT DOCUMENTS

| | | |
|---|---|---|
| JP | 59-060770 U | 4/1984 |
| JP | 10-112103 A | 4/1998 |
| JP | 10-269665 A | 10/1998 |
| JP | 2004-326977 A | 11/2004 |
| JP | 2005-293642 A | 10/2005 |
| JP | 2006-202379 A | 8/2006 |
| JP | 2006-338777 A | 12/2006 |
| WO | 99/67783 A1 | 12/1999 |

* cited by examiner

*Primary Examiner* — Ali Neyzari
(74) *Attorney, Agent, or Firm* — Nutter McClennen & Fish LLP; John J. Penny, Jr.; Christina M. Sperry (57) ABSTRACT

A path mechanism and an information processing device having the path mechanism can guide disc media to a predetermined position without the data recording area of the disc being affected. The path mechanism has a stacker tray 101 that forms a guide path 130 through which media M having an annular data recording area can move by sliding. The stacker tray 101 has a pair of guide surfaces 125c and 126c that support an outside circumference part of the media M slidably in the direction of media M travel. The guide surfaces 125c and 126c are formed to a width W that is less than the width A of the non-data-recording area Y rendered on the outside circumference side of the annular data recording area on the data recording surface of the media M.

18 Claims, 13 Drawing Sheets

PATH MECHANISM AND AN INFORMATION PROCESSING DEVICE HAVING THE PATH MECHANISM

BACKGROUND OF THE INVENTION

1. Field of Invention

The present invention relates to a path mechanism for guiding disc media such as CDs and DVDs, and to an information processing device having the path mechanism.

2. Description of Related Art

Media processing systems such as disc duplicators that write data to blank CDs (Compact Discs), DVDs (Digital Versatile Discs), and other media (information recording media), and CD/DVD publishers that both write the data and print a label to produce finished media, are now widely available. Such media processing devices generally have a drive for writing data to the media, a printer for printing on the label side of the media, and a media transportation mechanism for gripping and conveying the media to the drive and printer. See, for example, Japanese Unexamined Patent Appl. Pub. JP-A-2006-202379.

Some information processing devices for processing disc media as described above are constructed so that the processed discs slide down the inclined surface of a guide path and are deposited to a disc removal position where they can be easily removed by the user. However, a problem with structures that deliver the discs to the disc removal position by causing the discs to slide down an inclined plane is that the data recording surface of the disc can become scratched from rubbing against the inclined surface, and these scratches can cause errors when trying to read the disc.

SUMMARY OF THE INVENTION

A path mechanism and an information processing device according to the present invention can guide disc media to a predetermined position without the data recording area of the disc being affected.

A first aspect of the invention is a path mechanism that has a disc guide member forming a guide path through which a disc can move, wherein the disc guide member has a pair of support units that support a bottom surface part on the outside circumference side of the disc at positions on the side edge of the guide path, and each support unit is formed to a width that is less than the width of a non-processing area disposed on the outside circumference side of an annular processing area of the disc.

Because the pair of support units of the disc guide member forming the guide path that support a bottom surface part on the outside circumference side of the disc are formed to a width that is less than the width of the non-processing area disposed on the outside circumference side of the processing area of the disc, damage to the processing area when the disc moves can be prevented. More specifically, the disc can be guided to a predetermined position without affecting the processing area.

Preferably, the gap between a pair of wall units that rise outside the pair of support units and can contact the outside circumference part of the disc is greater than the outside diameter of the disc, and the difference between said gap and said outside diameter is in a range that is less than or equal to the width of the non-processing area of the disc. This aspect of the invention can reliably support the disc moving through the guide path by means of the pair of support units supporting only the non-processing area.

Yet further preferably, the width of each support unit is less than or equal to 1 mm.

As a result, the pair of support units can reliably support the disc at the non-processing area alone even when the width of the non-processing area of the disc is 1 mm as defined in the disc standard.

Another aspect of the invention is a path mechanism that has a disc guide member forming a guide path through which a disc can move, wherein the disc guide member has a pair of support units that are disposed along the direction of disc movement and support the disc, and each support unit is formed with a concave shape that descends toward the center of the guide path.

Because the support units of the disc guide member forming a guide path that supports a disc are formed with a concave shape that descends toward the center of the guide path when seen in a section view perpendicular to the direction of disc travel, only the corners of the outside circumference part on the bottom side of the disc touch the support units, and damage to the processing area when the disc moves can therefore be prevented. More specifically, the disc can be guided to a predetermined position without affecting the processing area.

In this aspect of the invention each support unit may be formed with a flat or a curved surface.

Because the support units are formed with a flat or curved surface that inclines down toward the center of the guide path when seen in a section view perpendicular to the direction of disc travel, only the corners of the outside circumference part on the bottom side of the disc touch the support units, and damage to the processing area when the disc moves can therefore be prevented. More specifically, the disc can be guided to a predetermined position without affecting the processing area.

Further preferably, a plurality of rolling bodies that can rotate on axes perpendicular to the direction of disc movement are disposed to each support unit arrayed along the direction of disc movement. Contact resistance with the disc can therefore be minimized, and the disc can be smoothly guided.

Yet further preferably, the inclination angle at which the support units of the guide member slope down in the direction of disc movement is greater on the upstream side in the direction of disc movement than on the downstream side. This aspect of the invention can eliminate problems caused by a disc in the guide path not moving downstream, and can reduce the speed of the disc when it is discharged from the guide path.

Another aspect of the invention is an information processing device having the path mechanism according to the invention and a processing unit that applies a process to the processing area of the disc.

By using this path mechanism that can guide a disc to a predetermined position without affecting the processing area, the information processing device according to the invention can process the processing area of the disc without the print quality or read quality of data recorded on the disc being affected.

Other objects and attainments together with a fuller understanding of the invention will become apparent and appreciated by referring to the following description and claims taken in conjunction with the accompanying drawings.

DESCRIPTION OF PREFERRED EMBODIMENTS

A preferred embodiment of a path mechanism and an information processing device having the path mechanism according to the present invention is described below with reference to the accompanying figures.

Note that a media processing device used as a disc publisher is described below as an example of an information processing device according to the present invention.

Figure 1:
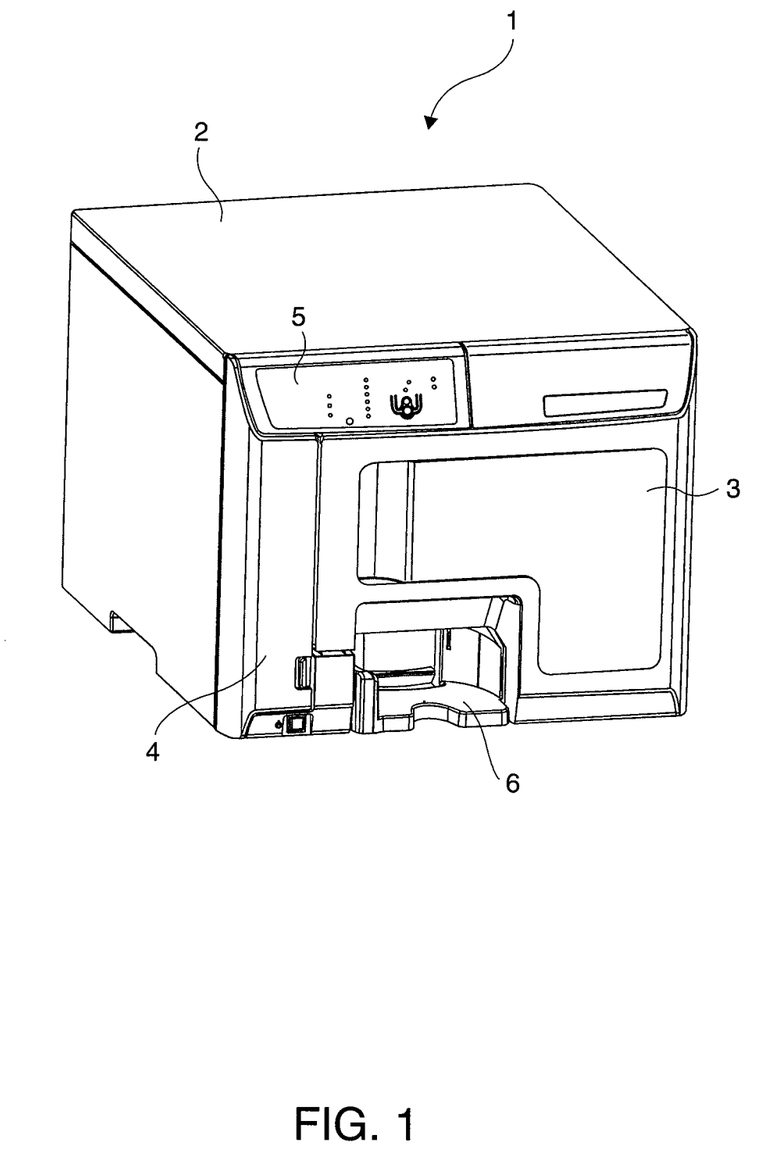
FIG. 1 is an oblique view of a disc publisher (information processing device).
Figure 2:
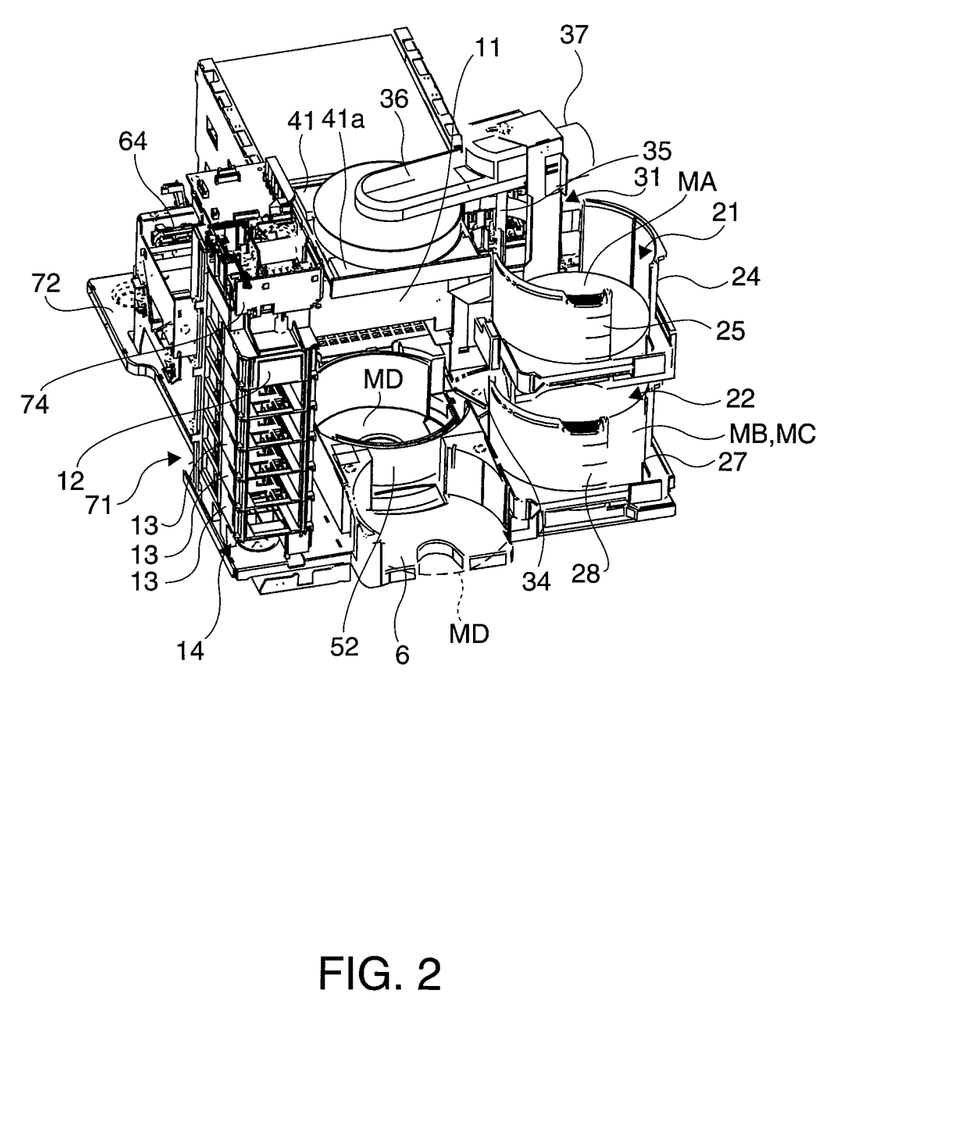
FIG. 2 is an oblique view from the front of the disc publisher with the disc publisher case removed.
Figure 3:
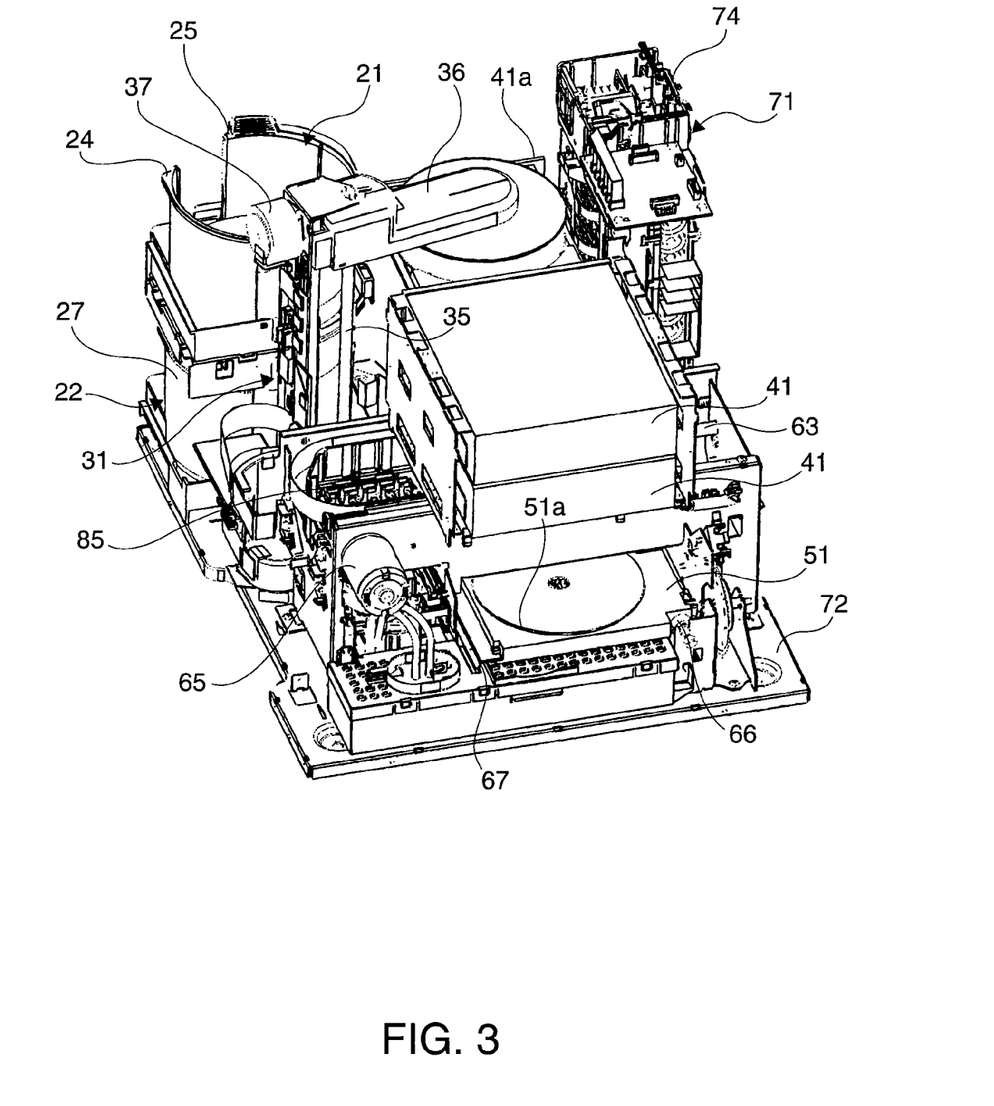
FIG. 3 is an oblique view from the back of the disc publisher with the case removed.
Figure 4:
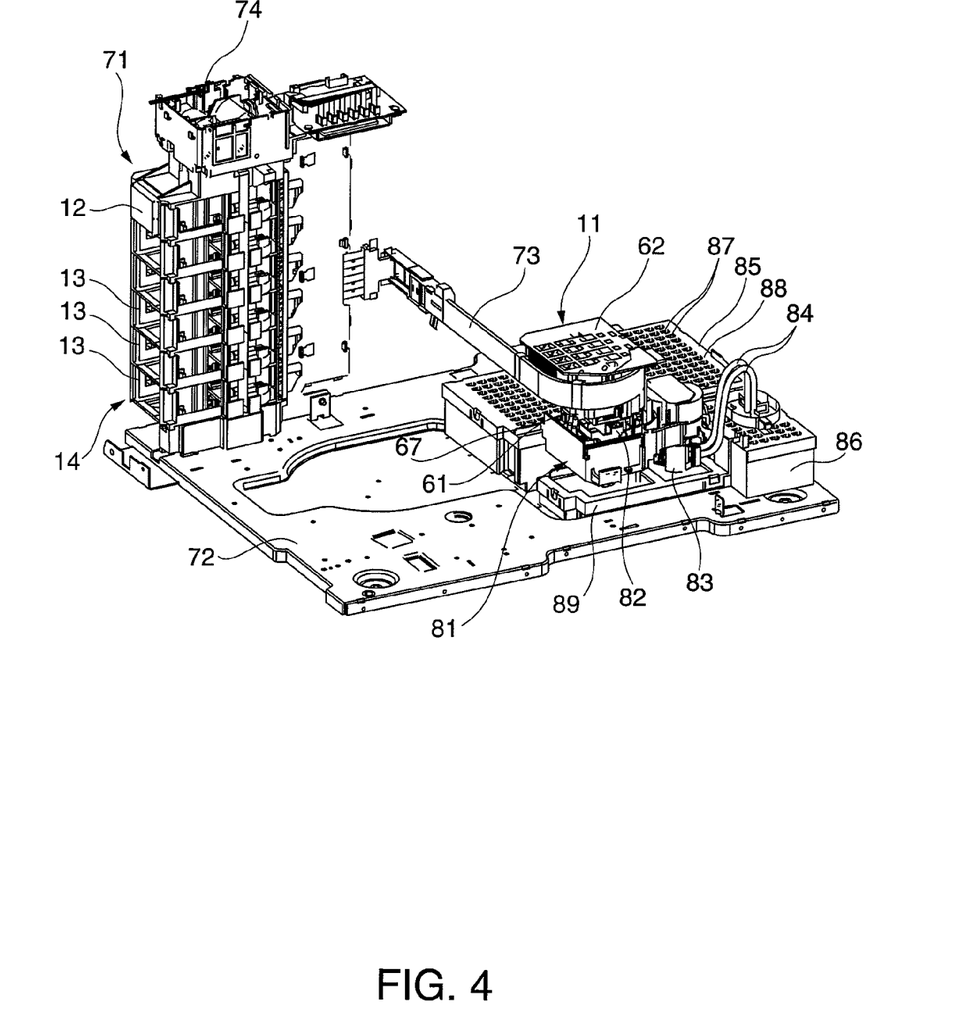
FIG. 4 is an oblique view of the printer unit installed in the disc publisher.

FIG. 1 is an oblique view of the disc publisher (information processing device), FIG. 2 is an oblique view from the front of the disc publisher with the disc publisher case removed, FIG. 3 is an oblique view from the back of the disc publisher with the case removed, and FIG. 4 is an oblique view of the label printer unit installed in the disc publisher.

The disc publisher 1 is a media processing device that writes data and prints on the label side of disc-shaped media such as CDs and DVDs, and has a basically box-shaped case 2. Doors 3 and 4 that open and close are attached at the front of the case 2 on the left and right. An operating panel 5 having various indicators and operating buttons is disposed at the top left part of the case 2, and a media exit 6 is disposed at the bottom of the case 2.

The door 3 on the right side when looking at the media processing device opens and closes to load unused blank media (referred to below as discs) and to remove processed discs.

As shown in FIG. 2, the door 4 on the front left side opens and closes for replacing the ink cartridges 12 of the label printer (recording device) 11. When the door 4 is open, a cartridge carrier unit 14 with a plurality of cartridge holders arrayed in a vertical stack is exposed.

As shown in FIG. 3, a blank media stacker 21 and a completed media stacker 22 are disposed coaxially one above the other inside the case 2 of the disc publisher 1. The blank media stacker 21 holds a plurality of unused blank discs MA to which data has not been written in a vertical stack. The completed media stacker 22 similarly stores completed discs MB.

The blank media stacker 21 has a pair of right and left curved side walls 24 and 25. The blank discs MA are placed from the top into the blank media stacker 21 between the side walls 24 and 25, which hold the discs in a substantially coaxial stack. The task of storing or adding the blank discs MA to the blank media stacker 21 can be done easily by opening the door 3.

The completed media stacker 22 located on the bottom is identically constructed with a pair of right and left curved side walls 27 and 28, enabling the completed discs MB to be inserted from the top and stored in a substantially coaxial stack.

The completed discs MB (that is, media for which writing data and printing the label side is finished) can also be removed by opening the door 3.

A media transportation mechanism 31 is located behind the blank media stacker 21 and the completed media stacker 22. The media transportation mechanism 31 has a vertical guide shaft 35 disposed between a horizontal support plate 34 attached to the base 72 and the chassis rendering a top panel not shown, and a transportation arm 36 that is attached to the vertical guide shaft 35. The transportation arm 36 can move vertically up and down along the vertical guide shaft 35 and can pivot right and left on the vertical guide shaft 35 by means of a drive motor 37. Media carried to the media exit 6 by the media transportation mechanism 31 can be removed from the disc publisher from the media exit 6.

Two media drives 41 are disposed one above the other beside the two stackers 21 and 22 and the media transportation mechanism 31, and the carriage 62 (see FIG. 4) of the label printer 11 is disposed movably below the media drives 41.

Each of the media drives 41 has a media tray 41a, which can move between a data writing position where data is recorded to the discs, and a media transfer position where the media can be loaded and unloaded from the media tray 41a.

The label printer 11 also has a media tray 51 that can move between a printing position for printing a label on the label side of the media, and a media transfer position where the media can be loaded and unloaded from the media tray 51.

FIG. 2 and FIG. 3 show the media tray 41a of the upper media drive 41 pulled out to the media transfer position, and the media tray 51 of the label printer 11 on the bottom at the inside label printing position.

The label printer 11 in this example is an inkjet printer that uses color ink cartridges 12 (for six colors, specifically, black, cyan, magenta, yellow, light cyan, and light magenta) as the ink supply mechanism 71. The ink cartridges 12 are installed from the front to the individual cartridge holders 13 of the cartridge carrier unit 14.

A space enabling the transportation arm 36 of the media transportation mechanism 31 to move up and down is formed between the pair of right and left side walls 24 and 25 of the blank media stacker 21 and between the pair of right and left side walls 27 and 28 of the completed media stacker 22. A space is also formed between the top and bottom blank media stacker 21 and completed media stacker 22 so that the transportation arm 36 of the media transportation mechanism 31 can pivot horizontally for positioning directly above the completed media stacker 22. When the media tray 41a is pushed into the media drive 41, the transportation arm 36 of the media transportation mechanism 31 descends and can access the media tray 51 in the media transfer position. Media can thus be conveyed to different stations by raising, lowering, and pivoting the transportation arm 36 right and left as needed.

A discard stacker 52 for storing discarded discs MD is located below the media transfer position of the media tray 51. In this embodiment of the invention the discard stacker 52 can hold approximately thirty discarded discs MD. The transportation arm 36 of the media transportation mechanism 31 can deliver a discarded disc MD into the discard stacker 52 when the media tray 51 has been moved to the data writing position from the media transfer position above the discard stacker 52.

It will thus be apparent that this configuration enables the transportation arm 36 of the media transportation mechanism 31 to carry media such as CDs and DVDs between the blank media stacker 21, the completed media stacker 22, the discard stacker 52, media tray 41a of the media drive 41, and the media tray 51 of the label printer 11.

The configuration of the label printer 11 is described next.

As will be known from FIG. 2 to FIG. 4, the label printer 11 has a carriage 62 to which an inkjet head 61 is disposed, and this carriage 62 is supported so that it can move horizontally bidirectionally along a carriage guide shaft 63. The carriage 62 has a timing belt 64 that is disposed horizontally along the carriage guide shaft 63, and a carriage motor 65 for driving the timing belt 64.

The inkjet head 61 is mounted on the carriage 62 with the nozzle surface facing down, and the media tray 51 can move horizontally in the direction between the front and back of the disc publisher (also referred to as the "front-back direction") below the inkjet head 61. The right side edge of the media tray 51 is supported by a guide shaft 66 that extends horizontally in the front-back direction, and the left side edge is supported so that it can slide on a guide rail 67 that also extends horizontally in the front-back direction. The drive mechanism of this media tray 51 also includes a timing belt not shown that is mounted horizontally in the front-back direction, and a tray motor for driving the timing belt.

The label printer 11 has an ink supply mechanism 71 with a cartridge carrier unit 14 in which the ink cartridges 12 are installed. The ink supply mechanism 71 is vertically constructed and is attached perpendicularly to the base 72 of the publisher 1. One end of a flexible ink supply tube 73 is connected to the ink supply mechanism 71, and the other end of the ink supply tube 73 is connected to the carriage 62.

Ink in the ink cartridges 12 loaded in the ink supply mechanism 71 is supplied through the ink supply tube 73 to the carriage 62. The ink is supplied to the inkjet head 61 through the damper unit and back pressure adjustment unit not shown disposed to the carriage 62.

A pressurizing mechanism 74 is disposed to the top of the ink supply mechanism 71. This pressurizing mechanism 74 pressurizes the inside of the ink cartridge 12 and expels ink from the ink pack in the ink cartridge 12.

An ink vacuum mechanism 81 is disposed below the home position (shown in FIG. 4) of the carriage 62.

The ink vacuum mechanism 81 has a cap 82 and a waste ink suction pump 83. The cap 82 covers the ink nozzles of the inkjet head 61 exposed below the carriage 62 in the home position. The waste ink suction pump 83 vacuums ink discharged into the head cap 82 by the ink charging operation and the head cleaning operation of the inkjet head 61.

Ink that is removed by the waste ink suction pump 83 of the ink vacuum mechanism 81 is discharged through another tube 84 into the waste ink absorption tank 85. This waste ink absorption tank 85 has an absorbent material 104 disposed inside the case 86 with the top covered by a cover 88 having numerous ventilation holes 87.

A waste ink catch pan 89 that is a part of the waste ink absorption tank 85 is disposed below the ink vacuum mechanism 81 to catch and absorb ink that drips from the ink vacuum mechanism 81 with an absorbent material.

The media tray 51 has a round shallow recess 51a for carrying the media disposed on the top surface of a rectangular plate. Three fingers not shown are disposed concentrically 120 degrees apart in the center of the recess 51a. The three fingers can move radially in unison, and are moved by a cam mechanism not shown when the media tray 51 is in the media transfer position.

When a disc is dropped from above into the recess 51a with the label side on which a label is to be printed facing up, the three fingers are inserted into the center hole of the disc. When the three fingers are then moved radially to the outside, the three fingers are pushed from the inside against the inside circumference edge of the center hole of the disc. The disc is thus held to the media tray 51. The tray motor not shown can then be driven to move the media tray 51 to the back along the guide shaft 66 into the printing area of the inkjet head 61. The specified content can then be printed on the label side of the disc by the inkjet head 61.

The discard stacker 52 that stores discarded discs MD and the media exit 6 from which the discarded discs MD or completed discs MB are discharged are disposed beside the blank media stacker 21 and completed media stacker 22 and are described next. Note that discarded discs MD and completed discs MB are collectively referred to below as media M.

Figure 5:
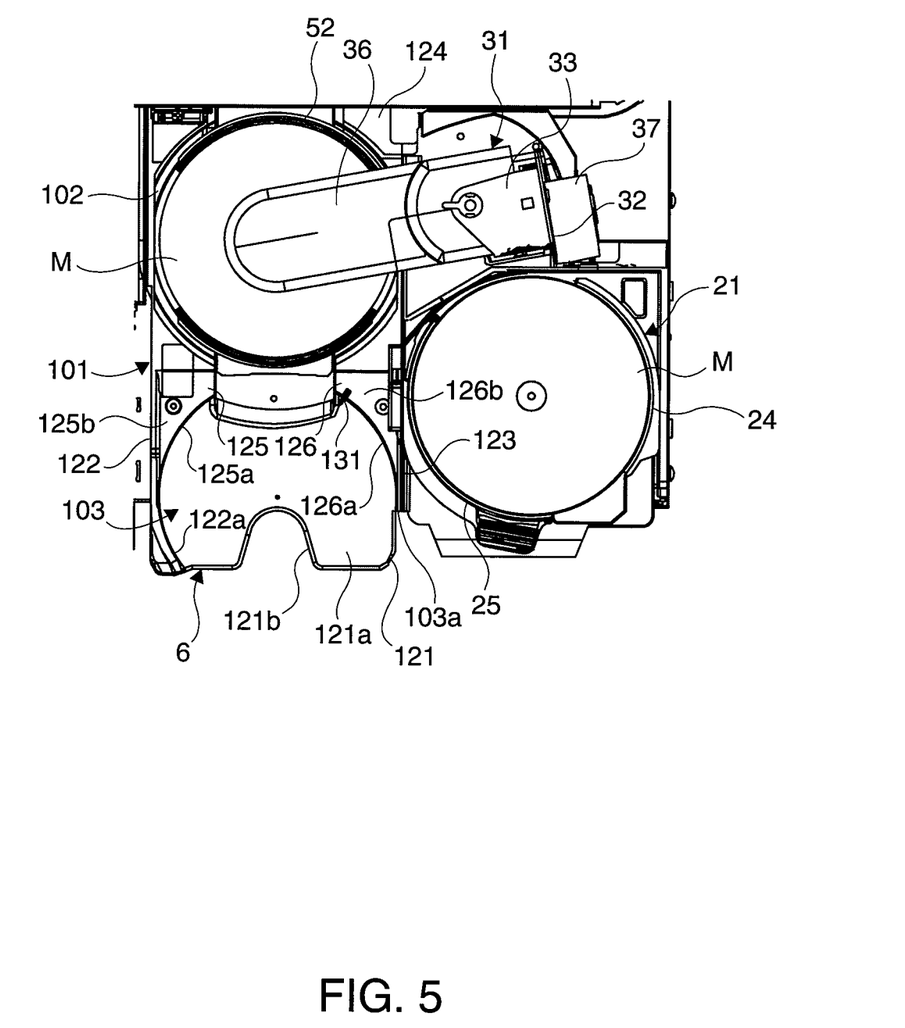
FIG. 5 is a plan view showing the internal configuration of the disc publisher.

FIG. 5 is a plan view showing the internal configuration of the disc publisher.

As shown in FIG. 5, a stacker tray 101 (disc guide member) is disposed beside where the blank media stacker 21 and completed media stacker 22 are disposed vertically one above the other, the discard stacker 52 is removably disposed behind the stacker tray 101 towards the back of the disc publisher, and a discharge media stacker unit 103 that is open to the media exit 6 is disposed at the front side of the stacker tray 101.

The media M can be stored stacked one on top of another in the discard stacker 52 and discharge media stacker unit 103, and in this embodiment of the invention thirty media M can be stacked in the discard stacker 52 and twenty can be stored in the discharge media stacker unit 103.

Similarly to the blank media stacker 21 and completed media stacker 22, the discard stacker 52 is located on the media M transportation path when the transportation arm 36 rotates, and media M can be carried to the discard stacker 52 by the transportation arm 36 moving up and down appropriately.

The discharge media stacker unit 103 is located adjacent to and in front of the discard stacker 52 at a position removed from the pivot path of the transportation arm 36 that is the disc transportation path.

The construction of the stacker tray and media exit is described next.

Figure 6:
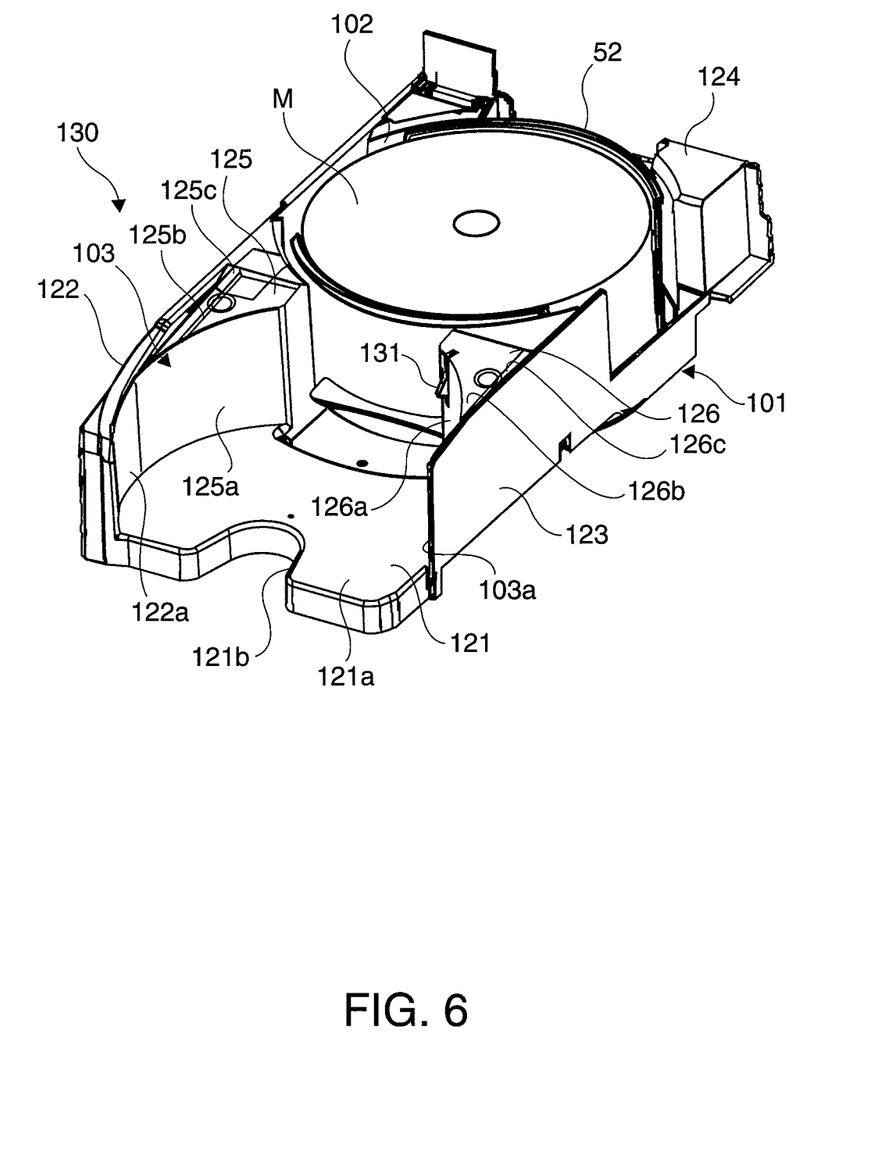
FIG. 6 is an oblique view of the stacker tray.
Figure 7:
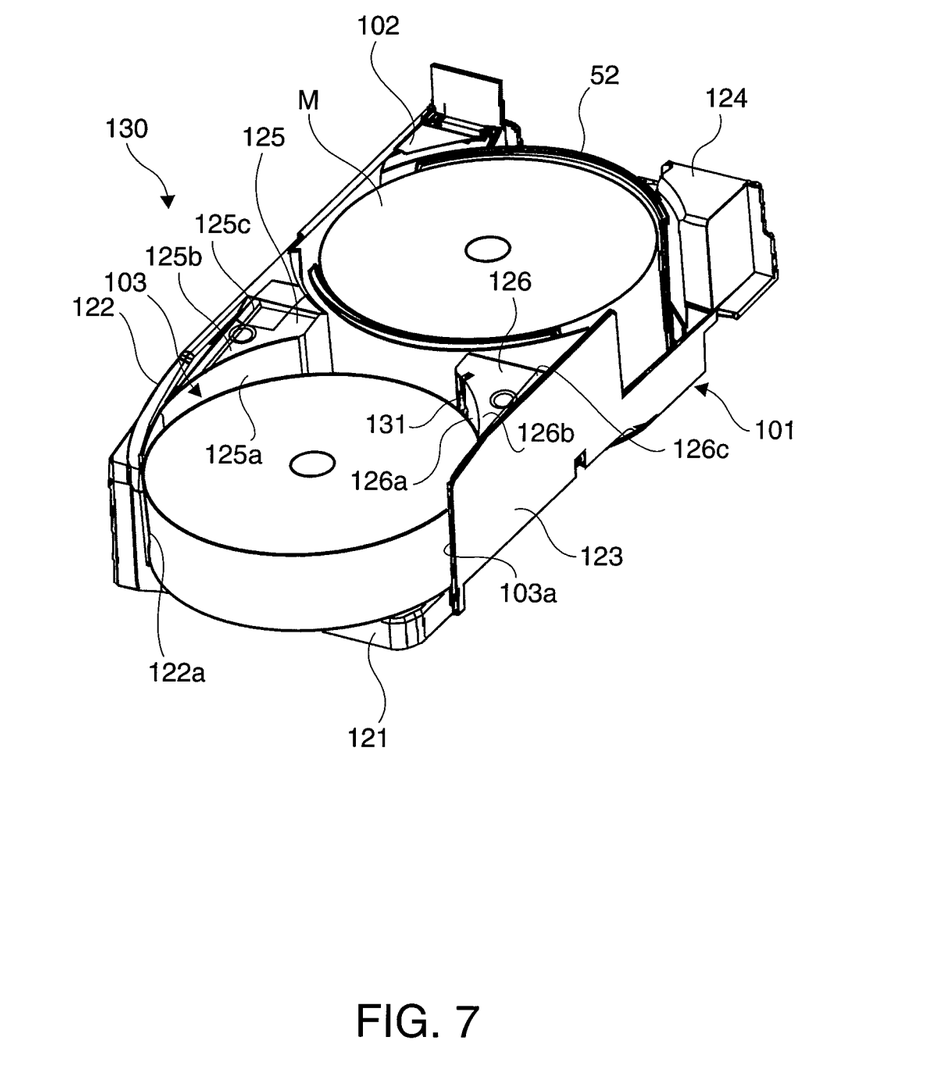
FIG. 7 is an oblique view of the stacker tray.
Figure 8:
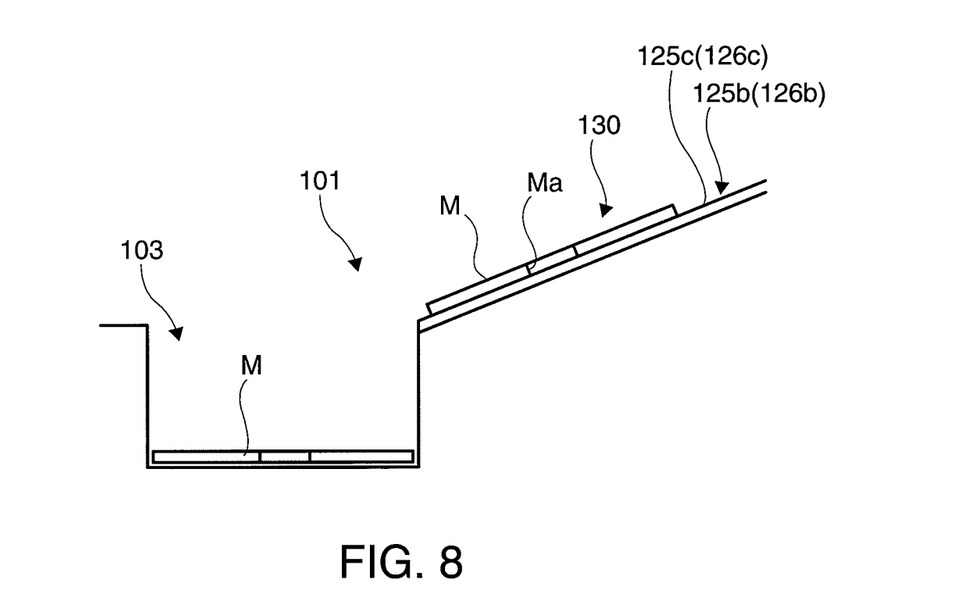
FIG. 8 is a side section view of the stacker stray.
Figure 9:
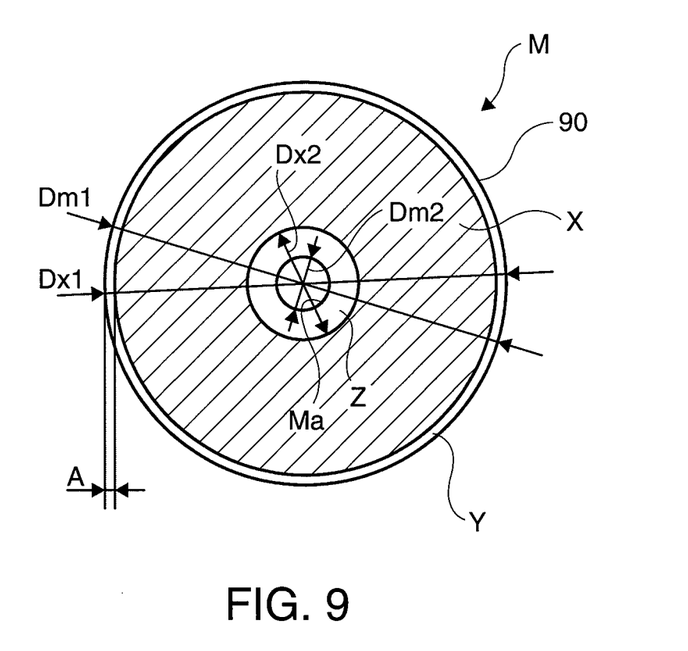
FIG. 9 is a plan view of the data recording surface side of the media used to describe the media.
Figure 10:
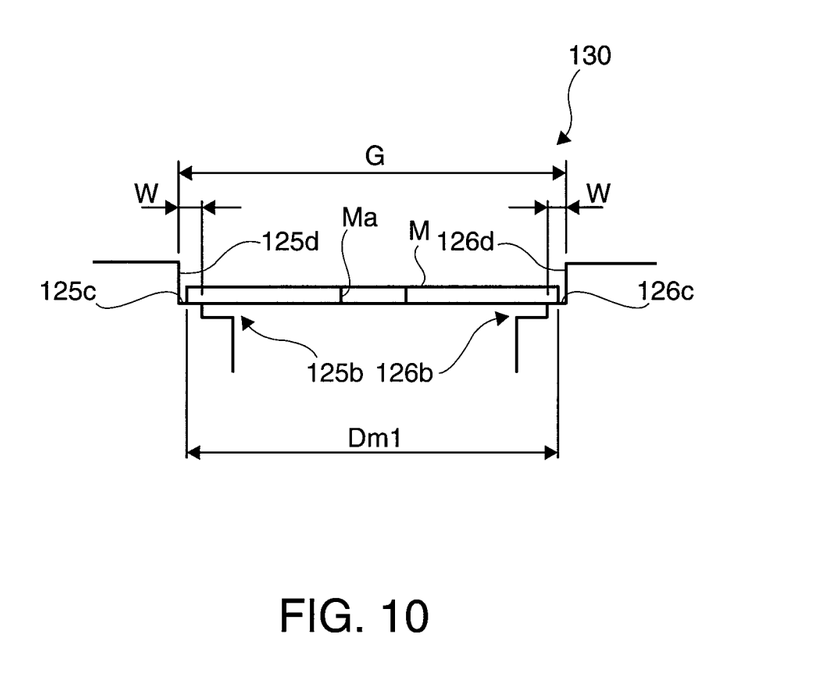
FIG. 10 is a schematic horizontal section view of the stacker stray.
Figure 11:
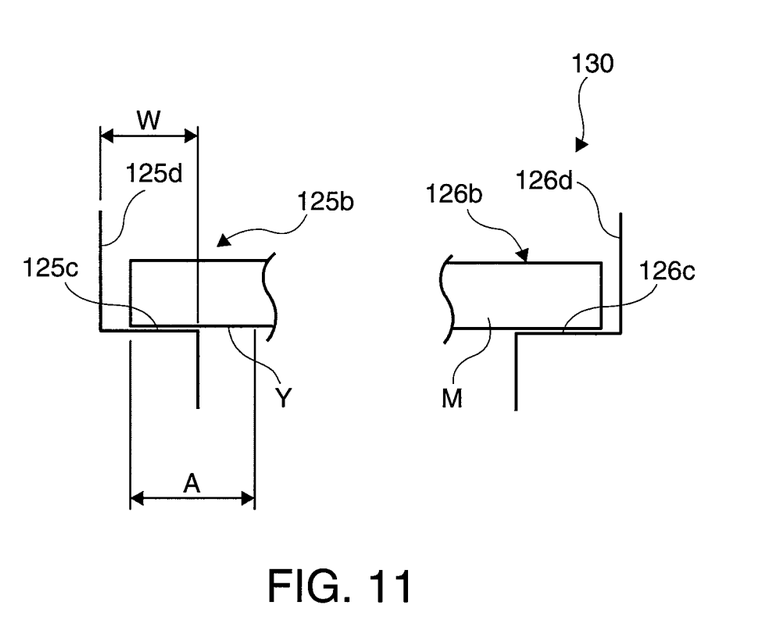
FIG. 11 is a schematic horizontal section view of the stacker stray.
Figure 12:
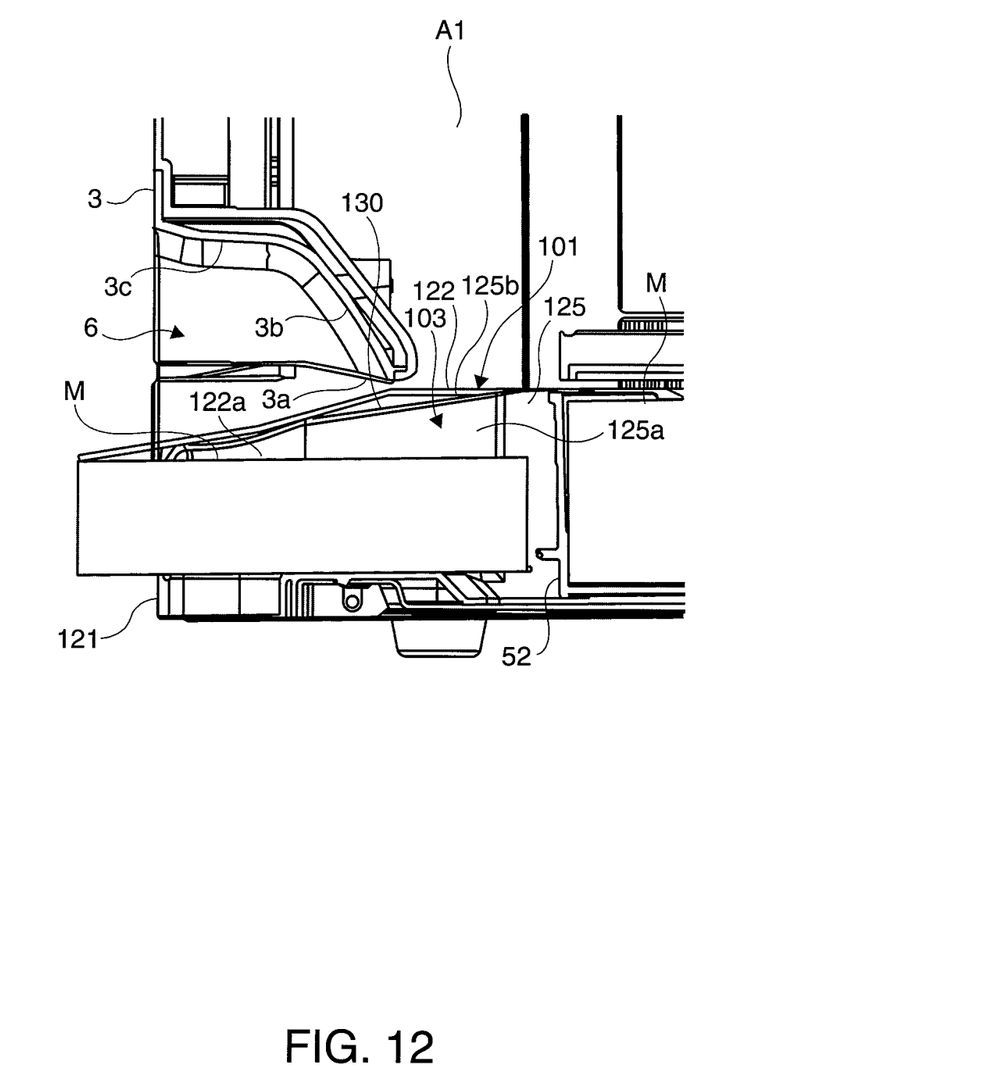
FIG. 12 is a section view of the media exit.
Figure 13:
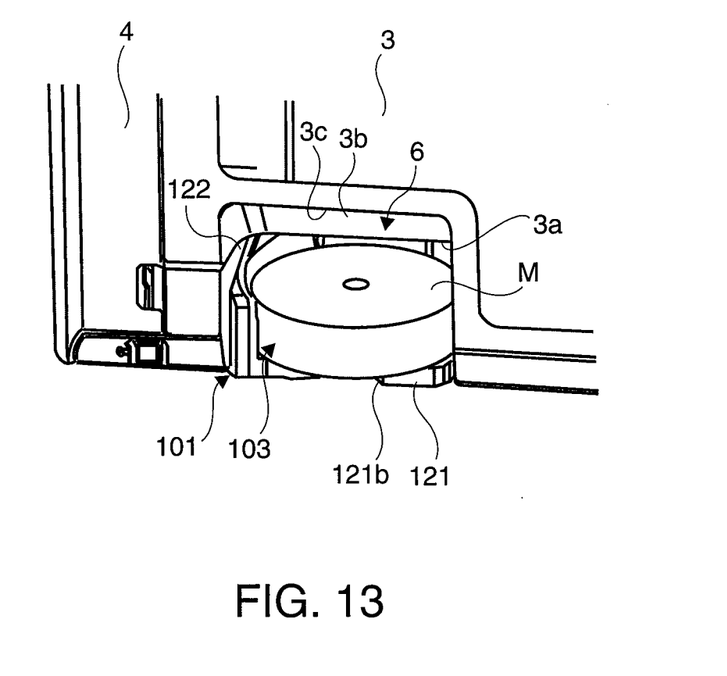
FIG. 13 is an oblique view showing the media discharged at the media exit.

FIG. 6 and FIG. 7 are oblique views of the stacker tray, FIG. 8 is a schematic side section view of the stacker tray, FIG. 9 is a plan view of the data recording area of the media used to describe the media, FIG. 10 and FIG. 11 are schematic horizontal section views of the stacker stray, FIG. 12 is a section view of the media exit, and FIG. 13 is an oblique view showing media discharged to the media exit.

As shown in FIG. 6 and FIG. 7, a stacker loading cavity 102 is formed behind the stacker tray 101, and the discard stacker 52 can be removably loaded in the stacker loading cavity 102. Media M can be easily removed by simply removing the discard stacker 52.

The stacker tray 101 is made of plastic, and has a bottom 121, side walls 122 and 123 rising up from the edges on the opposite sides of the bottom 121, and an end panel 124 rising from the back end of the bottom 121. Roughly trapezoidally shaped left and right dividers 125 and 126 are disposed at a position approximately in the middle in the front-back direction of the left and right side walls 122 and 123 protruding to the inside.

The stacker loading cavity 102, which is round when seen in plan view, is formed between the end panel 124 and the dividers 125 and 126 between the left and right side walls 122 and 123.

The front sides of the left and right dividers 125 and 126 are curved guide surfaces 125a and 126a that rise with the near-perpendicular slope rendered by a 0.5-degree draft angle. A curved guide surface 122a that continues smoothly into the curved guide surface 125a is rendered to the left-side side wall 122. The guide surfaces 125a and 126a are used to contact the outside edges Mb of the stored media M and limit movement of the media M. The guide surfaces 125a and 126a guide the media M with a minimal gap to the outside edge Mb of the media M, and the end part of the guide surface 122a at the opening 103a side is inside the arc of the curved guide surface 125a so that the media M are pushed to the media full detection sensor 131 disposed at an opposing position.

The front end of the right-side side wall 123 is cut off near the end part of the curved guide surface 126a of the right-side divider 126.

The space rendered between the guide surfaces 125a and 126a of the left and right dividers 125 and 126, the curved guide surface 122a of the left-side side wall 122, and the flat bottom portion 121a of the bottom 121 is the discharge media stacker unit 103.

The large space between the front end part of the truncated right-side side wall 123 and the front end part of the left-side side wall 122 where the curved guide surface 122a is formed renders an opening 103a to the discharge media stacker unit 103. Part of the media M stored therein protrudes from the opening 103a and is exposed in the media exit 6. The media M discharged into the discharge media stacker unit 103 can thus be removed at the media exit 6. Note that the height of the curved guide surface 122a at the front end part of the left-side side wall 122 is approximately the same height as the top of the disc M on the top of the media M stack when the discharge media stacker unit 103 is filled to capacity (20 discs in this embodiment of the invention) with media M.

The top surfaces of the left and right dividers 125 and 126 of the stacker tray 101 are inclined guides 125b and 126b formed sloping down to the front, and a guide path 130 for the media M is rendered to these inclined guides 125b and 126b. A pair of guide surfaces 125c and 126c (support parts) is formed to an edge part of the inclined guides 125b and 126b. A pair of guide walls 125d and 126d rises at the outside of these guide surfaces 125c and 126c.

As shown in FIG. 8, media M dropped from the transportation arm 36 are guided into the discharge media stacker unit 103 by sliding down between the guide walls 125d and 126d with a part of the outside circumference edge part of the bottom data recording surface in contact with the guide surfaces 125c and 126c of the inclined guides 125b and 126b rendering the guide path 130.

As shown in FIG. 9, the media M have a round center hole Ma used for chucking formed in the center of a transparent, disc-shaped polycarbonate substrate 90, and this center hole Ma is held by the gripping mechanism (not shown in the figure) disposed to the transportation arm 36 and media tray 51.

One side of the media M is a data recording surface. An annular data recording area (processing area) X is formed on the data recording surface, and the media drive 41 can read and write data to this data recording area X.

The outside diameter Dx1 of this data recording area X is less than the outside diameter Dm1 of the media M by a predetermined dimension, and the media M therefore has an annular non-data-recording area Y (non-processing area) of a specific width A (approximately 1 mm) where data cannot be read or written outside the data recording area X of the data recording surface.

Note, further, that the inside diameter Dx2 of the data recording area X is larger by a predetermined dimension than the inside diameter Dm2 of the center hole Ma in the substrate 90. As a result, there is also an annular non-data-recording area Z where data cannot be read or written on the inside circumference side of the data recording area X of the data recording surface.

The other side of the media M is a label side having an annular ink absorbent area (printing area) to which the label printer 11 can print, and a non-ink-absorbent area (non-printing area) where printing is not possible outside of the ink absorbent area.

The stacker tray 101 is connected to the front and back parts of the guide path 130 rendered by the inclined guides 125b and 126b that guide the media M to the discharge media stacker unit 103, and the mechanism that causes the stacker tray 101 and the media M at the front and back thereof to move is the path mechanism that causes the media M to move.

As shown in FIG. 10 and FIG. 11, the width W of the guide surfaces 125c and 126c forming the guide path 130 is less than or equal to the specific width A (less than or equal to 1 mm) of the non-data-recording area Y on the data recording surface of the media M.

The gap G between the pair of guide walls 125d and 126d of the inclined guides 125b and 126b is slightly greater than the outside diameter Dm1 of the media M, and the difference (G−Dm1) between these dimensions is less than or equal to the specific width A of the non-data-recording area Y of the data recording surface of the media M, that is, G−Dm1·1 mm.

When the media M slides down between the pair of guide walls 125d and 126d and is guided into the discharge media stacker unit 103, the non-data-recording area Y on the outside part of the data recording surface contacts the pair of guide surfaces 125c and 126c.

More specifically, the media M is guided into the discharge media stacker unit 103 without the data recording area X of the data recording surface touching the guide surfaces 125c and 126c.

As shown in FIG. 12, lines extending distally from the guide surfaces 125c and 126c of the inclined guides 125b and 126b first intersect at a top edge part of the discharge media stacker unit 103 at the downstream end in the direction in which the media M are guided (the left end in FIG. 12).

As a result, media M that slide down along the guide path 130 guided by the pair of guide surfaces 125c and 126c are stacked on top of the media M stored in the discharge media stacker unit 103 while reducing as much as possible contact with the top surface of the disc M on the top of the media M stack stored in the discharge media stacker unit 103, and therefore without the descending media M catching the top surface of the media M stored in the discharge media stacker unit 103.

As shown in FIG. 13, a notched part 3a is formed in the bottom end of the publisher 1 door 3 to avoid interference with the discharge media stacker unit 103, and this notched part 3a renders the media exit 6 when the door 3 is closed.

An extraction recess 3c with an inclined face 3b that slopes from top to bottom gradually towards the inside of the publisher 1 is formed in the top part of the discharge media stacker unit 103 at the notched part 3a.

This configuration enables the user to easily grip and remove the media M that are stored stacked in the discharge media stacker unit 103 and are exposed in the media exit 6 by lifting the media M towards the extraction recess 3c and pulling them out along the inclined face 3b.

A recessed part 121b is also formed in the center of the width at the front edge part of the bottom 121 of the discharge media stacker unit 103 so that when removing the media M from the discharge media stacker unit 103, the user's finger can be inserted from this recessed part 121b to easily grip the media M.

As described above, this embodiment of the invention can prevent damage to the data recording area X when the media M move because the guide surfaces 125c and 126c of the inclined guides 125b and 126b of the guide path 130 that slidably support the outside circumference part of the media M are formed to a width W that is less than the width A of the non-data-recording area Y rendered outside of the data recording area X of the data recording surface of the media M. In other words, the media M can be guided to the discharge media stacker unit 103, a predetermined position, without affecting the data recording area X.

More particularly, because the gap G between the pair of guide walls 125d and 126d of the inclined guides 125b and 126b of the guide path 130 is only slightly greater than the outside diameter Dm1 of the media M, and the difference between these dimensions is in a range that is less than or equal to the width A of the non-data-recording area Y of the media M, the media M moving along the guide path 130 can be supported reliably by the guide surfaces 125c and 126c touching only the non-data-recording area Y.

In addition, if the width W of the guide surfaces 125c and 126c is less than or equal to 1 mm, the pair of guide surfaces 125c and 126c can reliably support the media M at the non-data-recording area Y alone even when the width of the non-data-recording area Y of the media M is 1 mm as defined in the disc standard.

An information processing device rendered as the disc publisher 1 described above can write data to media M without affecting the read quality of data recorded on the media M because the media M can be guided to a predetermined position, that is, the discharge media stacker unit 103, without having any effect on the data recording area X.

The invention is not limited to the embodiment described above, and can be varied in many ways without departing from the scope of the accompanying claims as described below.

Note that below and in the referenced accompanying figures identical parts and parts having the same function as parts already described are identified by the same reference numerals, and further description thereof is simplified or omitted.

Figure 14:
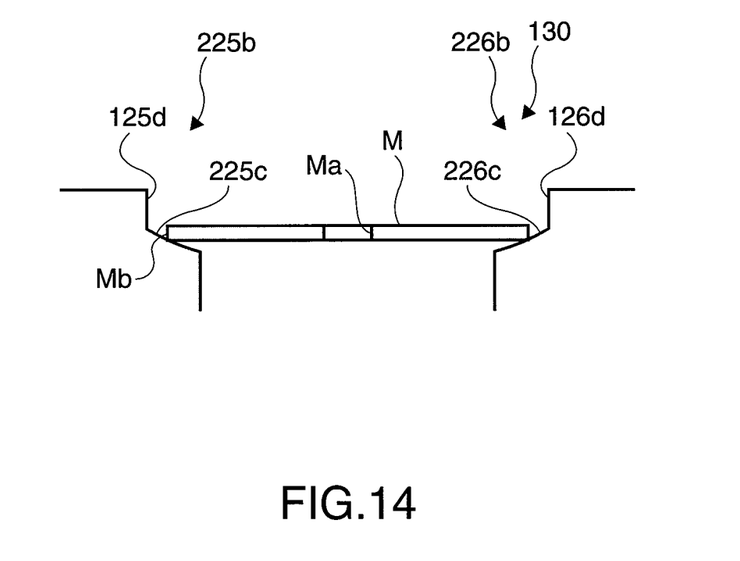
FIG. 14 is a schematic horizontal section view of the stacker stray according to another embodiment of the invention.

A first variation is shown in FIG. 14. In this variation the guide surfaces 225c and 226c of the inclined guides 225b and 226b that guide the media M to the discharge media stacker unit 103 are formed with a concave curved surface when seen in section view perpendicular to the direction of media M movement.

Figure 15:
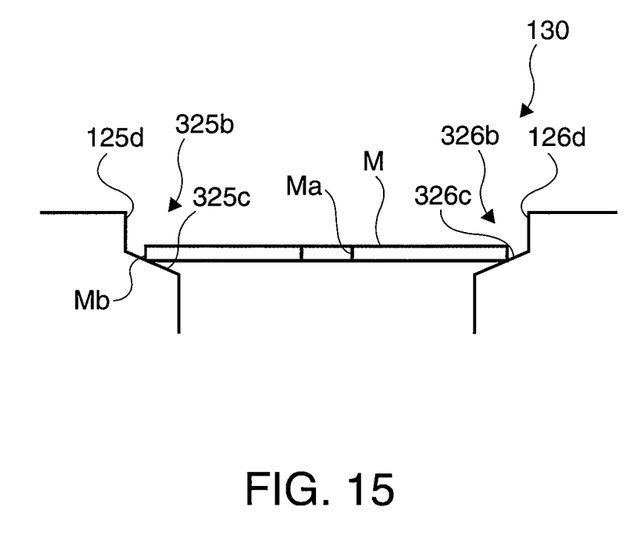
FIG. 15 is a schematic horizontal section view of the stacker stray according to another embodiment of the invention.

A second variation is shown in FIG. 15. In this variation the guide surfaces 325c and 326c of the inclined guides 325b and 326b that guide the media M to the discharge media stacker unit 103 are formed with a flat surface that slopes down toward the center of the guide path 130 when seen in section view perpendicular to the direction of media M movement.

When the guide surfaces 225c, 226c, 325c, 326c are thus formed receding downward to the center of the guide path 130, the media M sliding down guided by these guide surfaces 225c, 226c, 325c, 326c contact the guide surfaces 225c, 226c, 325c, 326c only at the outside circumference bottom corner edge, that is, the corner edge of the data recording surface.

Because the media M is thus guided to the discharge media stacker unit 103 without the data recording area X of the data recording surface touching the guide surfaces 225c, 226c, 325c, 326c, damage to the data recording area X while the media M is moving can be prevented. More specifically, the media M can be guided to the predetermined position of the discharge media stacker unit 103 without affecting the data recording area X.

When the guide surfaces 225c, 226c, 325c, 326c are shaped receding toward the center of the guide path 130 as described in these first and second variations, the width L of the guide surfaces 225c, 226c, 325c, 326c can be increased because contact is made only with the bottom corner of the media M. The distance between the guide walls 125d and 126d that guide the outside edge Mb of the media M can therefore be increased, and the media M can be easily set into the guide path 130.

Figure 16:
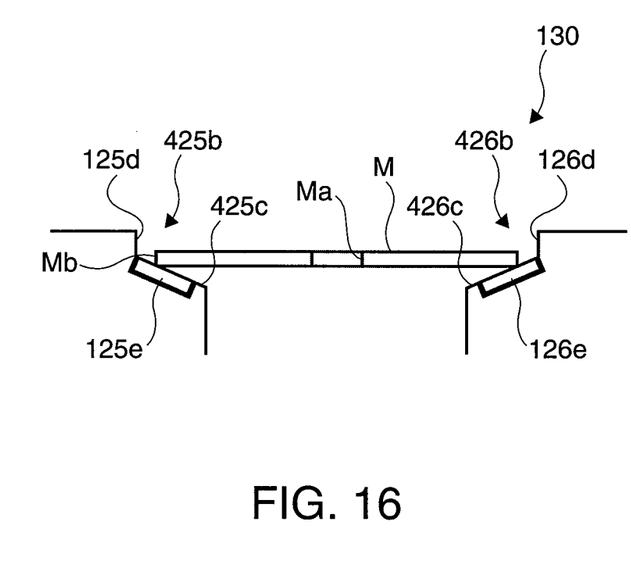
FIG. 16 is a schematic horizontal section view of the stacker stray according to another embodiment of the invention.

A third variation is shown in FIG. 16. In this variation the guide surfaces 425c and 426c of the inclined guides 425b and 426b that guide the media M to the discharge media stacker unit 103 are formed with a flat surface that slopes down toward the center of the guide path 130, and a plurality of rollers 125e and 126e that can rotate on axes perpendicular to the direction of media M movement are disposed in the top of the guide surfaces 425c and 426c arrayed along the direction in which the media M travels.

When a plurality of rollers 125e and 126e that can rotate on axes perpendicular to the direction of media M movement are disposed to flat guide surfaces 425c and 426c that are inclined down toward the center of the guide path 130, the media M sliding down along the guide surfaces 425c and 426c move smoothly while causing the rollers 125e and 126e to turn.

In other words, the media M are guided to the discharge media stacker unit 103 without the data recording area X of the data recording surface contacting the rollers 125e and 126e of the guide surfaces 425c and 426c.

In addition, when a plurality of rollers 125e and 126e that can rotate on axes perpendicular to the direction of media M travel are disposed to the guide surfaces 425c and 426c, contact resistance with the media M can be minimized and the media M can be guided smoothly. This fourth variation is described having flat surfaces that slope down toward the center of the guide path 130, but these surfaces do not need to be sloped.

The part that touches the media M is yet further preferably made from a low friction material, thus enabling guiding the media M even more smoothly. Note that a fluoroplastic or high polymer polyethylene material, for example, can be used as the low friction material.

Figure 17:
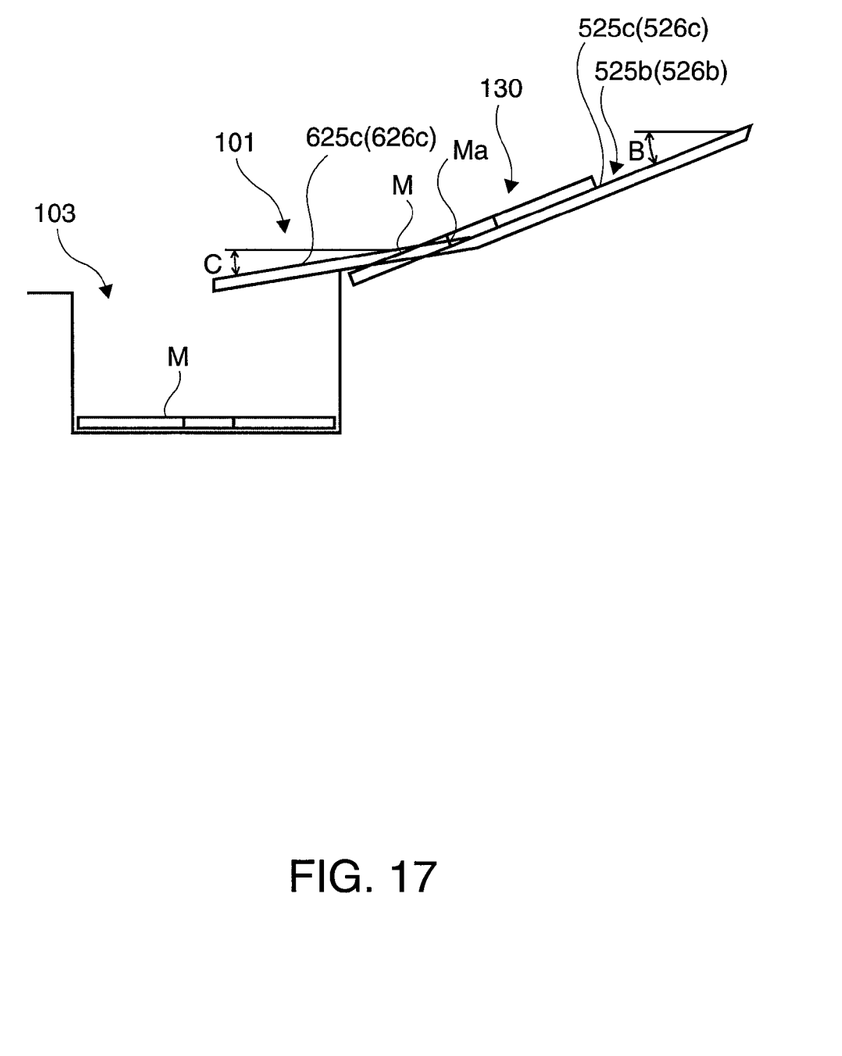
FIG. 17 is a schematic side section view of the guide path to the stacker stray in another embodiment of the invention.

The slope of the guide surfaces 125c, 126c of the inclined guides 125b and 126b is constant in the foregoing embodiments, but it is preferable for the media M to start sliding easily and for media M to travel slowly just before the media M is deposited into the discharge media stacker unit 103. FIG. 17 is a schematic section view of the guide path to the stacker stray in such a variation. In this variation the inclination angle B on the upstream side differs from the inclination angle C on the downstream side of the guide path 130 with the inclination angle B on the upstream side where the media M starts to slide being greater than the inclination angle C on the downstream side. This enables the media M to easily start moving downstream through the guide path 130, slow down due to the friction load of movement just before the discharge media stacker unit 103 due to the low angle of inclination, and then be deposited in the discharge media stacker unit 103. Because the inclination angle B on the upstream side is large, problems caused by the media M in the guide path 130 not moving downstream can be eliminated, the force of impact when the media M strikes the discharge media stacker unit 103 can be reduced because the speed of the media M when it is stored in the discharge media stacker unit 103 is slow, damage caused by said impact can be reduced and the sound of impact can be reduced.

The speed of media M movement can be controlled in many ways, and is not limited to the embodiment shown in FIG. 14. For example, two straight slopes with different angles of inclination are shown in FIG. 14, but a single continuous curved slope may be used instead. Further alternatively, the part that touches the media M where the media M starts to slide may be made of a low friction material such as a fluoroplastic while a high friction coefficient material may be applied at the side where the media M stops sliding.

The foregoing embodiments are described with the media M moving with the data recording surface facing down, but the invention can obviously also be used with the label side facing down. In this configuration the pair of guide surfaces 125c and 126c of the inclined guides 125b and 126b of the guide path 130 that slidably support the media M are formed to a width that is less than the width of the non-ink-absorbent area on the outside circumference side of the ink absorbent area on the label side of the media M. This configuration can prevent damage to the ink absorbent area as the media M moves. More specifically, the media M can be guided to the discharge media stacker unit 103, that is, a predetermined position, without affecting the ink absorbent area.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A path mechanism comprising:
a disc guide member forming a guide path through which a disc can move, the disc guide member comprising a pair of support units that support a bottom surface part on an outside circumference side of the disc at positions on a side edge of the guide path,
wherein each support unit is formed to a width that is less than a width of a non-processing area disposed on an outside circumference side of an annular processing area of the disc.

2. The path mechanism described in claim 1, wherein:
a gap between a pair of wall units that rise outside the pair of support units and can contact the outside circumference part of the disc is greater than an outside diameter of the disc, and a difference between the gap and the outside diameter is in a range that is less than or equal to the width of the non-processing area of the disc.

3. The path mechanism described in claim 1, wherein:
the width of each support unit is less than or equal to 1 mm.

4. A path mechanism comprising:
a disc guide member forming a guide path through which a disc can move, the disc guide member comprising a pair of support units that are disposed along a direction of disc movement and support the disc,
wherein each support unit is formed with a rolling body that can rotate on an axis perpendicular to the direction of disc movement.

5. The path mechanism described in claim 4, wherein:
each support unit is formed with a flat or a curved inclined surface that descends toward the center of the guide path.

6. The path mechanism described in claim 4, wherein:
the rolling body comprises a plurality of rolling bodies that can rotate on axes perpendicular to the direction of disc movement and that are disposed to each support unit and arrayed along the direction of disc movement.

7. The path mechanism described in claim 1, wherein:
the support units of the guide member slope down in a direction of disc movement at an inclination angle that is greater on an upstream side in the direction of disc movement than on a downstream side.

8. An information processing device comprising:
the path mechanism described in claim 1; and
a processing unit that applies a process to the processing area of the disc.

9. The path mechanism described in claim 2, wherein:
the width of each support unit is less than or equal to 1 mm.

10. The path mechanism described in claim 2, wherein:
the support units of the guide member slope down in a direction of disc movement at an inclination angle that is greater on an upstream side in the direction of disc movement than on a downstream side.

11. The path mechanism described in claim 3, wherein:
the support units of the guide member slope down in a direction of disc movement at an inclination angle that is greater on an upstream side in the direction of disc movement than on a downstream side.

12. The path mechanism described in claim 4, wherein:
the support units of the guide member slope down in the direction of disc movement at an inclination angle that is greater on an upstream side in the direction of disc movement than on a downstream side.

13. An information processing device comprising:
the path mechanism described in claim 2; and
a processing unit that applies a process to the processing area of the disc.

14. An information processing device comprising:
the path mechanism described in claim 3; and
a processing unit that applies a process to the processing area of the disc.

15. An information processing device comprising:
the path mechanism described in claim 4; and
a processing unit that applies a process to the processing area of the disc.

16. An information processing device comprising:
the path mechanism described in claim 5; and
a processing unit that applies a process to the processing area of the disc.

17. An information processing device comprising:
the path mechanism described in claim 6; and
a processing unit that applies a process to the processing area of the disc.

18. An information processing device comprising:
the path mechanism described in claim 7; and
a processing unit that applies a process to the processing area of the disc.

* * * * *